July 13, 1965

M. GARBUNY ET AL 3,194,989

THERMIONIC POWER CONVERSION DEVICES

Filed June 27, 1961

WITNESSES
Edwin E. Barber
Jordon H Telfer

INVENTORS
Max Garbuny, Milton Gottlieb
and Robert J. Zollweg
BY
Charles F. Renz
ATTORNEY વ
United States Patent Office 3,194,989
Patented July 13, 1965

3,194,989
THERMIONIC POWER CONVERSION DEVICES
Max Garbuny, Pittsburgh, Milton Gottlieb, Forest Hills, and Robert J. Zollweg, Monroeville, Pa., assignors to Westinghouse Electric Corporation, East Pittsburgh, Pa., a corporation of Pennsylvania
Filed June 27, 1961, Ser. No. 120,063
3 Claims. (Cl. 310—4)

This invention relates generally to thermionic power conversion devices and, more particularly, to physical structures for such devices which achieve practical levels of power conversion.

Thermionic power conversion devices are known which comprise generally a first electrode which becomes electron emissive upon the application of heat thereto and a second electrode for collection of electrons from the first electrode with the result that a potential difference is produced between the two electrodes. The principal problem in most such devices is that the build up of space charge in the inter-electrode space limits the device to relatively low levels of power generation. There have been proposed various methods of neutralizing the space charge so as to permit the device to draw high currents and generate practical power levels. These methods include the introduction of a medium into the inter-electrode space which forms positive ions. Cesium, because of its low ionization potential is a favorite material for this purpose. The cesium is typically ionized by contact with the hot electron emitter, as is described in connection with the device disclosed in United States Letters Patent No. 2,980,819, issued April 18, 1961 to G. R. Feaster and assigned to the same assignee as the present invention.

Another method of space charge neutralization is the utilization of a very close spacing between the emitter and the collector. Another method is the utilization of crossed electric and magnetic fields to affect the electron paths.

While the above methods and others have been successful in making actual power producing devices possible, it is still the case that a relatively large weight and volume device is required for generation of practical power levels. Practical power levels require greater than about 100 cm.² of cathode area. But in large devices, it is difficult to maintain a uniform electrode spacing over the total area of the device.

It is, therefore, an object of the present invention to provide an improved thermionic power conversion device.

Another object is to provide a thermionic power conversion device capable of achieving relatively high power generation in a compact unit.

Another object is to provide a thermionic power conversion device in which a large area electron emitter is closely spaced from an electron collector in a stable structure.

Another object is to provide a thermionic power converter having power generating capabilities which effectively utilize the high heat flux of heat sources such as nuclear fission sources.

According to the present invention, a thermionic power conversion device is provided having an electron emitter with a portion to enclose a source of heat to the device and a plurality of projections extending therefrom which have electron emissive surfaces. An electron collector is provided having substantially mating surfaces as those of the emitter projections so that when assembled the collector surfaces extend parallel to and are closely spaced from the electron emissive surfaces. According to other features of the invention, the electron emitter and the electron collector are constructed as above with the projections providing a screw action between the parts for easy assembly and for readily maintaining the close spacing between them during operation.

The features of the present invention which are believed to be novel are set forth with particularity in the appended claims. The present invention, together with the above mentioned and further objects and advantages thereof, may best be understood by reference to the following description, taken in connection with the accompanying drawings, in which:

Figure 1:
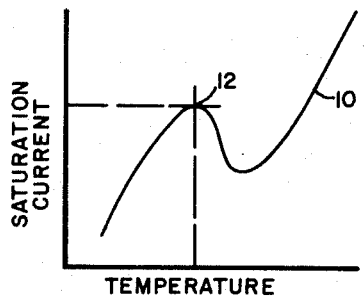
FIGURE 1 is a curve helping to explain the principles of the present invention.

FIG. 1 shows a curve 10 of saturation current against temperature for a thermionic electron emitter. Saturation current may be defined as the maximum current which may be obtained under a given set of conditions from a thermionic emitter. The saturation current drawn from an electron emitter, such as tungsten, has a rather high relative maximum 12 at a fairly low temperature when it is at least partially coated with cesium. It is known that at this temperature the cathode is cool enough so that the cesium will be adsorbed on its surface and will lower the work function of the cathode so that high currents can be reached.

The efficiency of a thermionic conversion device may be expressed as follows, certain losses such as in the lead to the device being neglected:

$$\text{Efficiency} = \frac{\phi_c - \phi_a}{\phi_c + 2kT_c + \frac{Q}{j}}$$

where $\phi_c$=cathode work function
$\phi_a$=anode work function
$k$=Boltzman's constant
$T_c$=absolute temperature of cathode
$Q$=radiation losses
$j$=current density from cathode It is therefore desirable to operate the cathode at as low a temperature as possible and at high current density, so long as other factors remain the same. However, the cathode work function is affected by the operating temperature in an inverse manner. While the relative maximum 12 on the curve 10 of FIG. 1 would be a desirable operating point at which to obtain high current density at relatively low temperature, the decrease in cathode work function may offset the gain in efficiency by making the difference between the work functions small. As a result, the selection of the operating point will be determined by a compromise between the different factors to obtain maximum efficiency. It has been found that the maximum efficiency will occur within the range from the temperature of the relative maximum up to about two hundred to six hundred degees above that temperature. This is still at a point of relatively high saturation current. A principal problem is that this high saturation current cannot be drawn because of space charge limitation. This is in spite of the fact that the cesium pressure can be quite high since the cathode work function is lowered considerably below that required for a high degree of contact ionization of the cesium and hence ion density is low. It is hence desirable to provide structures wherein the cathode and anode spacing is very small so that mechanism may be used to aid in space charge neutralization.

While the present invention and the particular structures resulting therefrom were designed particularly for use in the foregoing manner, that is, with an ionizable vapor at a pressure of the order of 1 mm. Hg used therein, it will be apparent that the disclosed structures are also useful in other types of thermionic devices including those operating at high vacuum.

Figure 2:
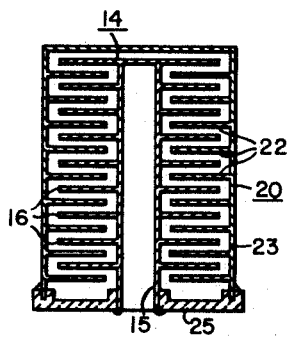
FIG. 2 is a cross-sectional view of one embodiment of the thermionic power conversion device in accordance with the present invention.

Referring now to FIGURE 2, there is shown a device with an electron emitter 14 substantially surrounded by an electron collector 20. A heat enclosure or channel 15 for the introduction of heat into the device is in the center of the emitter 14 and is an integral part thereof. The electron emitter 14 has a plurality of projections 16 on the external surface of the heat channel 15. The projections 16 have electron emissive surfaces and are mated with similar projections 22 on the internal surface of the wall 23 of the electron collector 20. The heat channel 15 and the wall 23 of the collector are joined together by an insulating member 25 to form a vacuum tight envelope. In the resulting structure, projections 16 and 22 of the emitter and collector, respectively, are stacked over each other in an alternating sequence. As is obvious, a large surface area electron source is provided with collector surfaces disposed closely spaced thereto. Unfortunately, such a structure is difficult to assemble and it may warp due to thermal expansion at high temperatures and therefore other structures hereinafter described are preferred.

Figure 3:
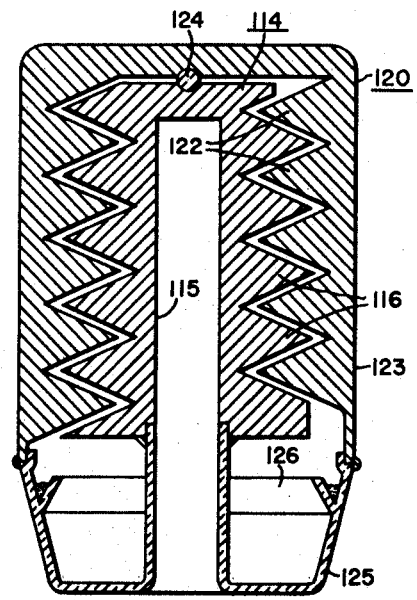
FIGS. 3 through 6 are cross-sectional views of alternate embodiments of thermionic power conversion devices in accordance with this invention.

In FIG. 3 there is shown a device which is similar to that of FIG. 2 in that a portion of the generally cylindrical electron emitter 114 provides a channel 115 for heat to be admitted while on its exterior are disposed generally radial projections 116. The surrounding electron collector 120 has an outer wall 123 with projections 122 on its inner surface. The projections 122 have surfaces which extend parallel to and are closely spaced from the surfaces of the electron emissive projections 116. In this structure, the projections 116 and 122 on the electron emitter and electron collector are, in effect, mating screw threads. The collector 114 can be screwed over the emitter 120 like a nut on a bolt. A member 124 of insulating material is provided at the end of the emitter 114 to insulate it from the collector 120 and to position the emitter and collector surfaces at an optimum distance from each other. A ceramic member 125 or the like may be sealed between the emitter and collector to provide a vacuum tight envelope. Also, a reservoir 126 for an ionizable material such as cesium may be provided at one end of the device.

It is desirable that the emitter 114 and collector 120 be made of different bulk materials so that the effective temperature differences between the two during operation is compensated by matching expansion coefficients. In this way, the gap between the surfaces is invariant with temperature. For example, an emitter 114 made of tungsten and a collector 120 made of nickel remain approximately matched for the case in which the emitter is at a temperature equal to about twice the temperature of the collecor since the thermal expansion coefficient of nickel is about twice that of tungsten. It is not necessary that the entire members 114 and 120 be of such materials for they may have in addition a cover layer or plating of materials which are chosen because of their thermionic conversion efficiency such as molybdenum, niobium, barium and strontium oxides and certain carbides.

Figure 4:
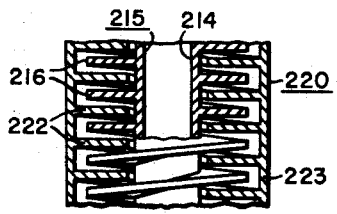

FIG. 4 shows a partial sectional view of a screw type device modified somewhat from that in FIG. 3. The device of FIG. 4 has reduced volume in the projections 216 and 222 of the emitter 214 and collector 220, respectively, which comprise the screw threads so that the ratio of active thermionic emission area to the volume or weight of the device can be particularly large. The heat channel 215 and the outer wall 223 would be joined as in FIGS. 2 and 3.

Figure 5:
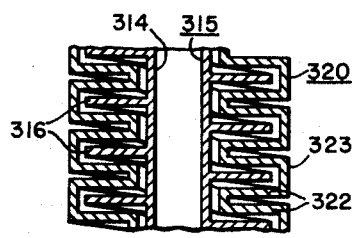

In FIG. 5 there is shown a partial sectional view of a device having a further modification in that the external surface 323 of the electron collector 320 has a configuration such that it conforms to the contour established by the projections 316 on the electron emitter 314. The heat channel 315 and electron emissive projections 316 are essentially like those shown in FIG. 4. In this way there is provided a device which has inherent in the structure cooling fins on the collector 320. Direct heat transfer from the electron collecting surfaces 322 to the external atmosphere permits the collector 320 to be maintained at a cooler temperature than the cathode.

Figure 6:
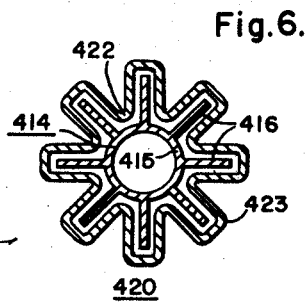

In FIG. 6 there is shown a sectional view of a device configuration differing somewhat from those in FIGS. 2–5 in that the electron emissive projections 416 on the electron emitter 414 extend radially from the generally cylindrical heat enclosure portion 415 in a manner such that they are parallel to the cylinder axis rather than perpendicular to it. The electron collector 420 has a configuration such that the electron collecting surfaces 422 extend within the external surface 423 to conform with the emitter surfaces 416.

As is well known, any heat source may be used to generate power from a thermionic power conversion device. For example, nuclear fuel or burning gas may be employed which can be disposed within the heat channels provided in the structures shown.

The emitters and collectors of the structures shown, such as 114 and 120 in FIG. 3, are machined or otherwise formed from suitable materials preferably selected for their thermal expansion characteristics such as above described. The dimensions of the members are selected so that the emitter and collector projections or threads 116 and 120 are disposed apart by about 0.010 inch or less. This spacing is adequate for use in gas filled devices but in vacuum devices it would be necessary to go to smaller spacings in order to neutralize the space charge.

It has been found that the maximum 12 on the curve of FIGURE 1 can be shifted to somewhat higher temperatures by the presence of other gases besides cesium in the cell to form a coating on the emitter for which cesium has greater heat of adsorption and so that the work function of the emitter is reduced by a larger amount.

Operation in the region near the low temperature maximum 12 prolongs the life of the emitter since it is not harmed by evaporation. Also, radiation loss at these low temperatures is relatively small.

It is, therefore, a result of the present invention that a thermionic power conversion device is provided which combines a surface area which is large compared to the volume and weight of the device with the rigidity necessary to maintain the needed close spacing for space charged neutralization throughout a considerable temperature range.

While the present invention has been shown and described in certain forms only, it will be obvious to those skilled in the art that it is not so limited but is susceptible of various changes and modifications without departing from the spirit and scope thereof.

We claim as our invention:
1. A thermionic power conversion device capable of achieving relatively high power generation in a compact unit comprising: an electron emitter having a substantially cylindrical configuration with a first set of screw threads on the external surface thereof, said first set of screw threads having electron emissive surfaces; an electron collector having a substantially cylindrical configuration with a second set of screw threads on the inner surface thereof; means to maintain the surfaces of said screw threads in closely spaced and electrically insulated arrangement so that the surfaces of said second set of screw threads extend parallel to and closely spaced from the electron emissive surfaces of said first set of screw threads.

2. A thermionic power conversion device capable of achieving relatively high power generation in a compact unit comprising: an electron emitter having a substantially cylindrical configuration with a first set of screw threads providing a plurality of projections on the external surface thereof, said first set of screw threads having electron emissive surfaces; an electron collector having a substantially cylindrical configuration with a second set of screw threads on the inner surface thereof; means to maintain the surfaces of said screw threads in closely spaced and electrically insulated arrangements so that the surfaces of said second set of screw threads extend parallel to and closely spaced from the electron emissive surfaces of said first set of screw threads, the external surface of said electron collector comprising a plurality of projections conforming to said projections on said electron emitter so as to enable efficient heat transfer to the external atmosphere.

3. A thermionic power conversion device capable of achieving relatively high power generation in a compact unit comprising: an electron emitter having a substantially cylindrical configuration with a first set of screw threads providing a plurality of projections on the external surface thereof, said first set of screw threads having electron emissive surfaces; an electron collector having a substantially cylindrical configuration with a second set of screw threads on the inner surface thereof; means to maintain the surfaces of said screw threads in closely spaced and electrically insulated arrangement so that the surfaces of said second set of screw threads extend parallel to and closely spaced from the electron emissive surfaces of said first set of screw threads, the external surface of said electron collector comprising a plurality of projections conforming to said projections on said electron emitter so as to enable efficient heat transfer to the external atmosphere, said plurality of projections on said cathode and said plurality of projections on said anode being in the form of mating screw threads.

References Cited by the Examiner
UNITED STATES PATENTS

| | | |
|---|---|---|
| 2,696,564 | 12/54 | Ohmart. |
| 2,837,666 | 6/58 | Linder. |
| 2,980,819 | 4/61 | Feaster _____ 310—4 |
| 3,054,914 | 9/62 | Hatsopoulos _____ 310—4 |

MILTON O. HIRSHFIELD, *Primary Examiner.*